(12) United States Patent  
Gomes et al.

(10) Patent No.: US 7,931,331 B2
(45) Date of Patent: Apr. 26, 2011

(54) HEADREST WITH ENERGY DISSIPATER FOR REAR PASSENGER

(75) Inventors: Leonardo Gomes, Clawson, MI (US); Philippe Duhamel, Clawson, MI (US)

(73) Assignee: Faurecia Automotive Seating, Inc., Auburn Hills, MI (US)

( * ) Notice: Subject to any disclaimer, the term of this patent is extended or adjusted under 35 U.S.C. 154(b) by 0 days.

(21) Appl. No.: 12/412,076

(22) Filed: Mar. 26, 2009

(65) Prior Publication Data

US 2010/0244511 A1  Sep. 30, 2010

(51) Int. Cl.
*B60N 2/42* (2006.01)
*B60N 2/427* (2006.01)
*B60R 21/055* (2006.01)
*B60R 22/28* (2006.01)

(52) U.S. Cl. ................ 297/216.12; 297/408
(58) Field of Classification Search ........... 297/216.12, 297/408
See application file for complete search history.

(56) References Cited

U.S. PATENT DOCUMENTS

| 6,199,947 | B1 * | 3/2001 | Wiklund | 297/216.12 |
| 6,419,322 | B2 * | 7/2002 | Nakane et al. | 297/408 |
| 6,631,949 | B2 * | 10/2003 | Humer et al. | 297/216.12 |
| 6,631,955 | B2 * | 10/2003 | Humer et al. | 297/216.12 X |
| 6,634,715 | B2 * | 10/2003 | Nakane et al. | 297/408 |
| 6,655,733 | B2 * | 12/2003 | Humer et al. | 297/216.12 |
| 6,789,846 | B2 * | 9/2004 | Humer et al. | 297/216.12 |
| 7,540,562 | B2 * | 6/2009 | Sekida | 297/216.12 |
| 7,758,114 | B2 * | 7/2010 | Yokota et al. | 297/216.12 |
| 2001/0004167 | A1 * | 6/2001 | Takeda et al. | 297/408 |
| 2003/0001414 | A1 * | 1/2003 | Humer et al. | 297/216.12 |
| 2003/0011224 | A1 * | 1/2003 | Humer et al. | 297/216.12 |
| 2003/0015897 | A1 * | 1/2003 | Humer et al. | 297/216.12 |
| 2004/0119324 | A1 * | 6/2004 | Humer et al. | 297/216.12 |
| 2008/0012402 | A1 * | 1/2008 | Sekida | 297/216.12 |
| 2010/0320817 | A1 * | 12/2010 | Humer et al. | 297/216.12 |

* cited by examiner

*Primary Examiner* — Rodney B White
(74) *Attorney, Agent, or Firm* — Barnes & Thornburg LLP (57) ABSTRACT

A headrest for mounting on one or more vertically extending posts positioned on the backrest of a vehicle seat, the headrest comprising one or more mounting sleeves positioned on the headrest and adapted to surround a portion of a respective one of said posts, pivot means extending between each mounting sleeve and the respective post to mount the mounting sleeve on the respective post in pivotal relation thereto about a pivot axis substantially transverse to the longitudinal axis of the post, each mounting sleeve being shaped and otherwise dimensioned on an internal surface to resist pivotal motion of the headrest between first and second positions below application of a directed threshold force to the headrest.

19 Claims, 11 Drawing Sheets

HEADREST WITH ENERGY DISSIPATER FOR REAR PASSENGER

FIELD OF THE INVENTION

The present invention relates to the field of headrests and more specifically to, an automobile headrest having an energy dissipating function for a rear passenger impacting the back of the headrest.

BACKGROUND OF THE INVENTION

A front seat automobile headrest includes an energy dissipating function for an object colliding with the back of the front seat of the vehicle when the vehicle undergoes a deceleration caused by a crash or other impact. As a result of the deceleration, the object, typically a rear passenger, having forward momentum continues forward and collides with the back of the front seat. Generally, a seat belt is worn and the body of the passenger is restrained such that the rear passenger's head collides with the back of the headrest.

In the prior art, the energy dissipating function is typically formed by the headrest including a foam core component having a soft material covering. The combination of the foam core and soft covering provides a headrest which compresses during impact, thereby dissipating the resultant energy present as the forward momentum carries the rear passenger into the back of the headrest.

Regulatory standards govern the energy dissipating function of the headrest. Typically, prior art headrest designs have a surface hardness of about 50 Shore A. UN-ECE Regulation 17, titled "Uniform Provisions Concerning the Approval of Vehicles With Regard to the Seats, their Anchorages and Head Restraints," includes provisions for seats and more specifically headrests. The test for energy dissipation on the rear of a headrest including a pendulum whose pivot is supported by ball-bearings, having a mass at its centre of percussion of 6.8 kg impacting the rear of the headrest at an angle of 45 degrees from the vertical at a speed of 24.1 km/h. The deceleration of the pendulum must not exceed 80 g continuously for more than 3 ms.

Variations in the design of prior art headrests are restricted by the selection of alternative foams and material coverings. There is also an added difficulty in predicting dynamic behavior and performance during the impact of a crash as those skilled in the art will appreciate when working with foam materials. In the absence of easily modeled and simulated dynamic behavior, design has a greater reliance on iterative testing and therefore resulting in a compliant design over longer development times.

The multi-step process of forming material covered foam headrests includes producing the molded and contoured foam core, treating the foam as required and subsequently covering it with the soft material. This process is time consuming, expensive and results in significant wasted materials.

There is a need in the art for an automobile headrest which can be produced more cost effectively and eliminates the need to rely on a foam and soft material to provide the energy dissipating function. There is a further need for a single component headrest which allows for better dynamic behavior modeling such that the difficulties associated with crash simulations and predicting dynamic behavior and performance during a crash can be mitigated such that overall design of the headrest becomes easier.

SUMMARY OF THE INVENTION

In accordance with a first embodiment of the present invention there is disclosed a headrest for mounting on one or more vertically extending posts positioned on the backrest of a vehicle seat, the headrest comprising one or more mounting sleeves adapted to surround a portion of a respective one of said posts, a pivot means extending between each sleeve portion and the respective post to mount said mounting sleeve on the respective post in pivotal relation thereto about a pivot axis substantially transverse to the longitudinal axis of the post; and, wherein said one or more mounting sleeves are shaped and otherwise dimensioned on an internal surface to interact with the respective post to resist pivotal movement of the headrest between first and second pivot positions below application of a directed threshold force to the headrest.

In accordance with one aspect of the first embodiment, there is disclosed a headrest wherein mounting sleeves frictionally interact with the respective post in a region adjacent to the pivot means so as to resist pivotal motion as aforesaid.

In accordance with another aspect of the first embodiment, there is disclosed a headrest wherein said mounting sleeves each comprise at least a first sleeve portion contiguous with a second sleeve portion, with said first sleeve portion shaped and otherwise dimensioned to surround and retain an initial portion of the post in contacting relation when the headrest is in said first pivot position, and with said second sleeve portion shaped and otherwise dimensioned to surround and retain a final portion of the post in contacting relation when said headrest is in said second pivot position.

In accordance with another aspect of the first embodiment, there is disclosed a headrest wherein the post is cylindrical, said first and second sleeve portions have substantially semi-circular cross-sections defining a first sleeve axis and a second sleeve axis respectively, wherein said first sleeve axis is aligned with the longitudinal axis of the post when the headrest is in said first pivot position, and wherein said second sleeve axis is aligned with the longitudinal axis of the post when the headrest is in said second pivot position.

In accordance with another aspect of the first embodiment, there is disclosed a headrest wherein said internal surface is shaped and otherwise dimensioned as a waisted portion between said first sleeve portion and said second sleeve portion to resist movement of the headrest between the first and the second pivot positions below application of said directed threshold force to the headrest.

In accordance with another aspect of the first embodiment, there is disclosed a headrest further comprising one or more energy absorption recesses positioned within said sleeve portions in adjacent relation to said waisted portion to allow flexion of said waisted portion upon said interaction with the respective post.

In accordance with another aspect of the first embodiment, there is disclosed a headrest wherein the post comprises a free end and, in said first pivot position, said free end contacts an interior surface of said first sleeve portion, and, in said second position, said free end contacts an interior surface of said second sleeve portion, thereby limiting said pivotal movement of the headrest in an opposed pivotal direction.

In accordance with another aspect of the first embodiment, there is disclosed a headrest wherein said pivot means comprises a pin extending transversely through the post.

In accordance with another aspect of the first embodiment, there is disclosed a headrest wherein said headrest is on a front seat of a vehicle and said threshold force is directed at the headrest by a rear passenger onto a rear surface of the headrest.

In accordance with another aspect of the first embodiment, there is disclosed a headrest wherein said headrest is constructed from a plastics material.

In accordance with another aspect of the first embodiment, there is disclosed a headrest wherein said plastics material is selected from the group consisting of polypropylene, ABS, nylon and other thermoplastics materials.

In accordance with another aspect of the first embodiment, there is disclosed a headrest further comprising one or more lug portions extending rearwardly from a main body portion of the headrest to house said one or more sleeve portions.

In accordance with a second aspect of the present invention there is disclosed a method for dissipating impact energy on a headrest comprising mounting a headrest on one or more vertically extending posts positioned on the backrest of a vehicle seat, the headrest comprising one or more mounting sleeves adapted to surround a portion of a respective one of said posts; providing a pivot means extending between each mounting sleeve and the respective post to mount said mounting sleeve on the respective post in pivotal relation thereto about a pivot axis substantially transverse to the longitudinal axis of the post; and, providing an internal surface on the mounting sleeves which frictionally interact with the respective post to resist pivotal movement of the headrest between first and second pivot positions below application of a directed threshold force to the headrest.

In accordance with another aspect of the invention, there is disclosed a method wherein said mounting sleeves each comprise at least a first sleeve portion contiguous with a second sleeve portion, with said first sleeve portion shaped and otherwise dimensioned to surround an initial portion of the post in contacting relation when the headrest is in said first pivot position, and with said second sleeve portion shaped and otherwise dimensioned to surround a final portion of the post in contacting relation when said headrest is in said second pivot position.

In accordance with another aspect of the invention, there is disclosed a method wherein the post is cylindrical, said first and second sleeve portions have semi-circular cross-sections defining a first sleeve axis and a second sleeve axis respectively, wherein said first sleeve axis is aligned with the longitudinal axis of the post when the headrest is in said first pivot position, and, wherein said second sleeve axis is aligned with the longitudinal axis of the post when the headrest is in said second pivot position.

In accordance with another aspect of the invention, there is disclosed a method wherein said internal surface is shaped and otherwise dimensioned as a waisted portion between said first sleeve portion and said second sleeve portion to resist movement of the headrest between the first and the second pivot positions below application of said directed threshold force to the headrest.

In accordance with another aspect of the invention, there is disclosed a method further comprising the step of providing one or more energy absorption recesses positioned within said sleeve portions in adjacent relation to said waisted portion to allow flexion of said waisted portion upon said interaction with the respective post.

In accordance with another aspect of the invention, there is disclosed a method wherein the post comprises a free end and, in said first pivot position, said free end contacts an interior surface of said first sleeve portion, and, in said second position, said free end contacts an interior surface of said second sleeve portion thereby limiting said pivotal movement of the headrest in an opposed pivotal direction.

In accordance with another aspect of the invention, there is disclosed a method wherein said pivot means comprises a pin extending transversely through the post.

In accordance with another aspect of the invention, there is disclosed a method wherein said headrest is on a front seat of a vehicle and said threshold force is directed at the headrest by a rear passenger onto a rear surface of the headrest.

It is thus an object of this invention to obviate or mitigate at least one of the above mentioned disadvantages of the prior art.

Other advantages, features and characteristics of the present invention, as well as methods of assembly, operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the headrest according to the present invention, as to its structure, organization, use and method of operation, together with further objectives and advantages thereof, will be better understood from the following drawings in which embodiments of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1A:
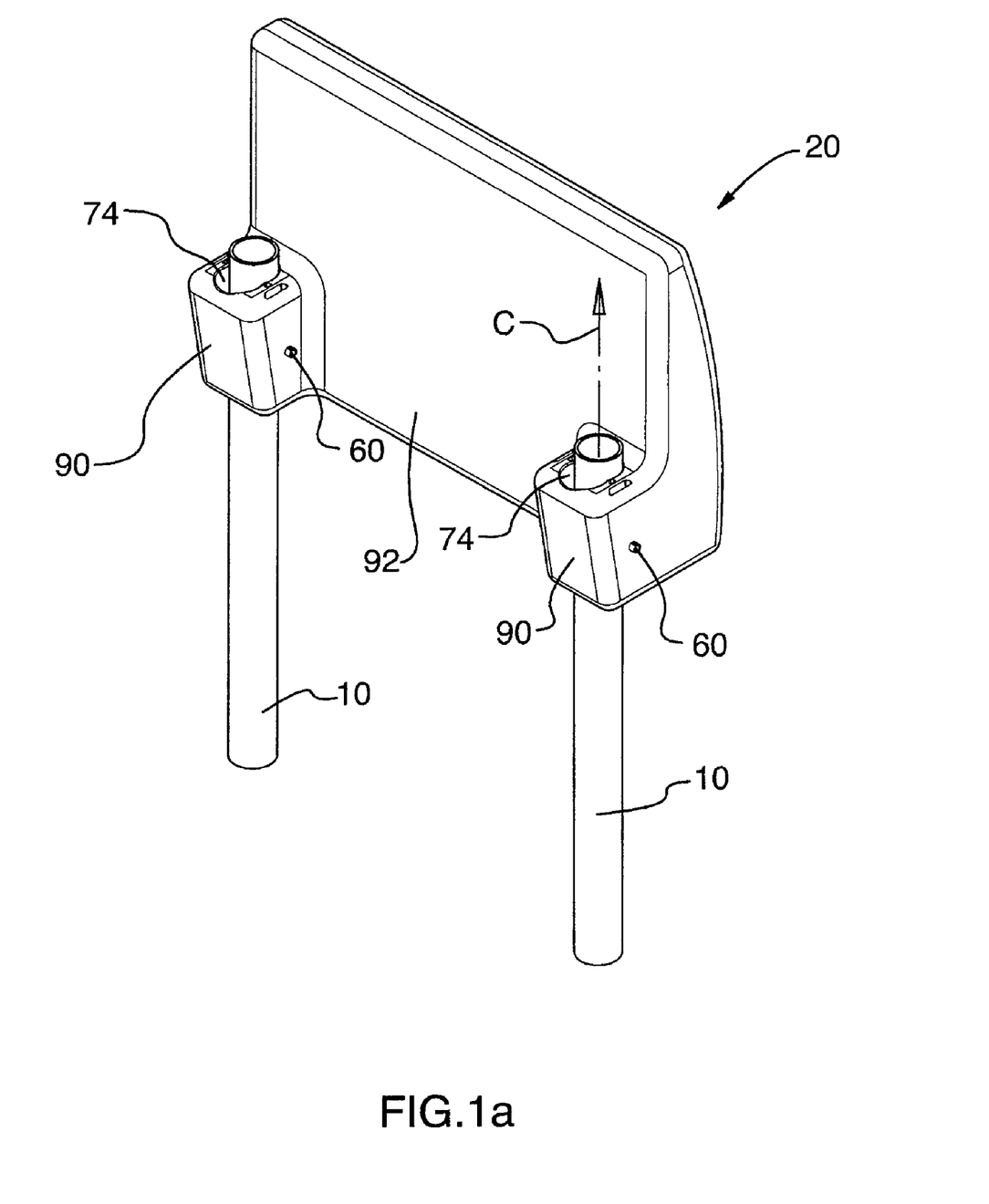
FIG. 1a is a perspective view of a headrest according to one embodiment of the invention in a first pivot position.
Figure 1B:
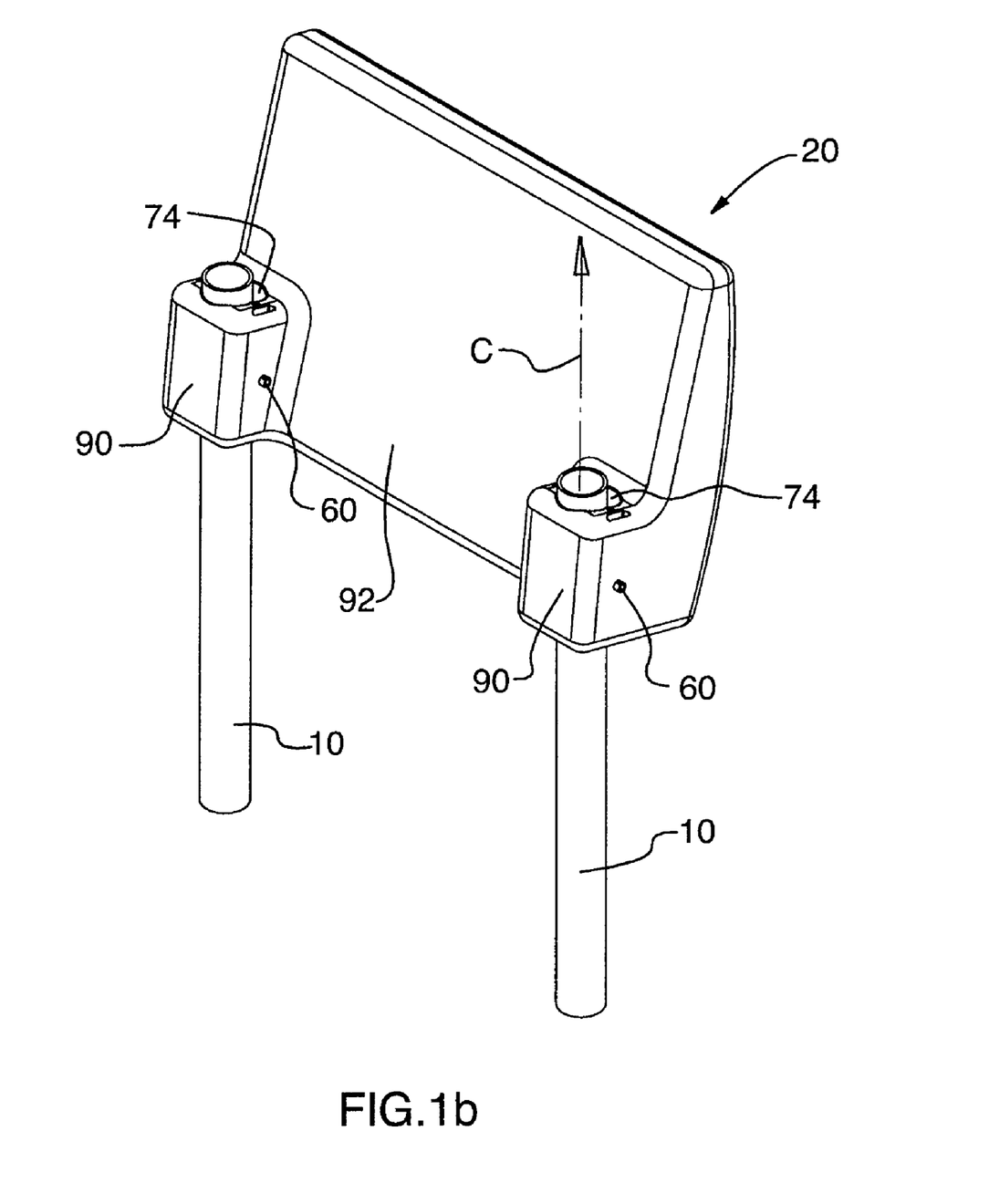
FIG. 1b is a perspective view of the headrest of FIG. 1a in a second pivot position.
Figure 1C:
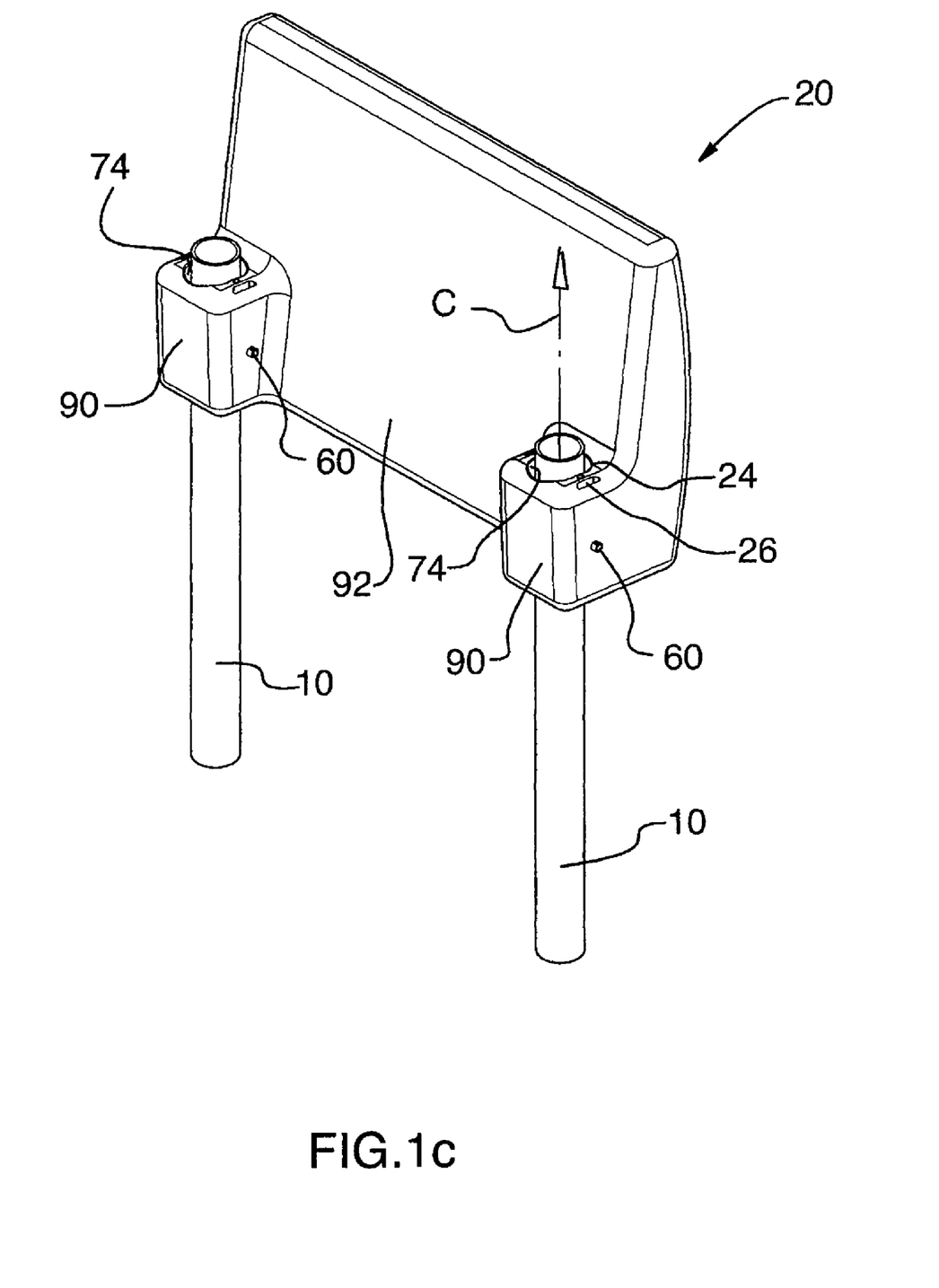
FIG. 1c is a perspective view of the headrest of FIG. 1a in an intermediate position between the first and second pivot positions.

Referring now to FIGS. 1a-1c of the drawings, there is shown a headrest 20 according to a preferred embodiment of the present invention. Mounted on the backrest (not shown) of a vehicle seat is typically a pair of vertically extending cylindrical posts 10 upon which the headrest 20 is mounted. The descriptor "vertically" is used herein only in reference to a general direction from the backrest and is not meant as an absolute direction to limit the present invention. The headrest 20 includes one or more mounting sleeves 74 each adapted to surround a longitudinal portion or segment of a respective one of mounting posts 10. In the preferred embodiment illustrated, there are two mounting sleeves 74 for respective mounting on each post 10 in pivotal relation thereto, such that the headrest 20 can pivot, in a controlled manner, from a first pivot position, as shown in FIG. 1a, through an intermediate position, as shown in FIG. 1c, and on to a second pivot position, as shown in FIG. 1b. With first and second pivot positions defining limit positions for pivoting of the headrest 20. The two mounting sleeves 74, the two posts 10, and their related parts and interacting assemblies are substantially the same as one another. This description will proceed to describe one such assembly, it being understood by those skilled in the art that the description below applies equally well to analogous parts and related assemblies. Accordingly, the features and elements which allow for such controlled pivotal movement of the headrest 20 relative to the posts 10 according to the invention are described in more detail below.

The headrest 20 optionally includes lug portions 90 extending rearwardly from a main body portion 92 of the headrest. The lug portions 90 each form a housing for a respective one of the mounting sleeves 74, and may be overlain with a removable cover (not shown), or may be formed as an internal feature (not shown) within the main body portion 92.

Preferably, each of the mounting sleeves 74 consists of two contiguous sleeve portions 30 and 40. Referring particularly to FIGS. 2, 3 and 4a-4c, sleeve portions, or segments, 30 and 40 are shaped and otherwise dimensioned on an internal surface to interact with the respective post 10 on which they are mounted in a manner described more fully hereinbelow to resist movement of the headrest 20 between the first and second pivot positions below application of a directed threshold force directed at the headrest. More particularly, the sleeve portion 30 surrounds and contacts an initial portion 11 of the respective post 10 when the headrest 20 is in the first pivot position (see FIGS. 3 and 4a), and, the sleeve portion 40 surrounds and contacts a final portion 13 of the post 10 when the headrest 20 is in the second pivot position (see FIG. 4b). In this manner, the headrest 20 is retained in both the first and second pivot positions against further rotational movement beyond the respective limit positions.

The headrest 20 is pivotally mounted on the post 10 about pivot axis D by a pivot means which, in the illustrated embodiment, comprises a split pin 60 extending across the open diameter of each mounting sleeve 74 to mount it on the respective post 10. The pin 60 may be fixed relative to either the post 10, or, to the headrest 20, in a mid-region of the sleeve portions 30 and 40, and is rotatable with respect to the other. When pin 60 is fixed relative to the post 10, the headrest 20 pivots about the pin 60 and therefore about the post 10, from the first pivot position to the second pivot position. When pin 60 is fixed relative to the headrest 20, it is not restrained by post 10, for example by a rotatable fit therewithin, such that the headrest 20 and the pin 60 pivot in unison about the post 10.

Figure 2:
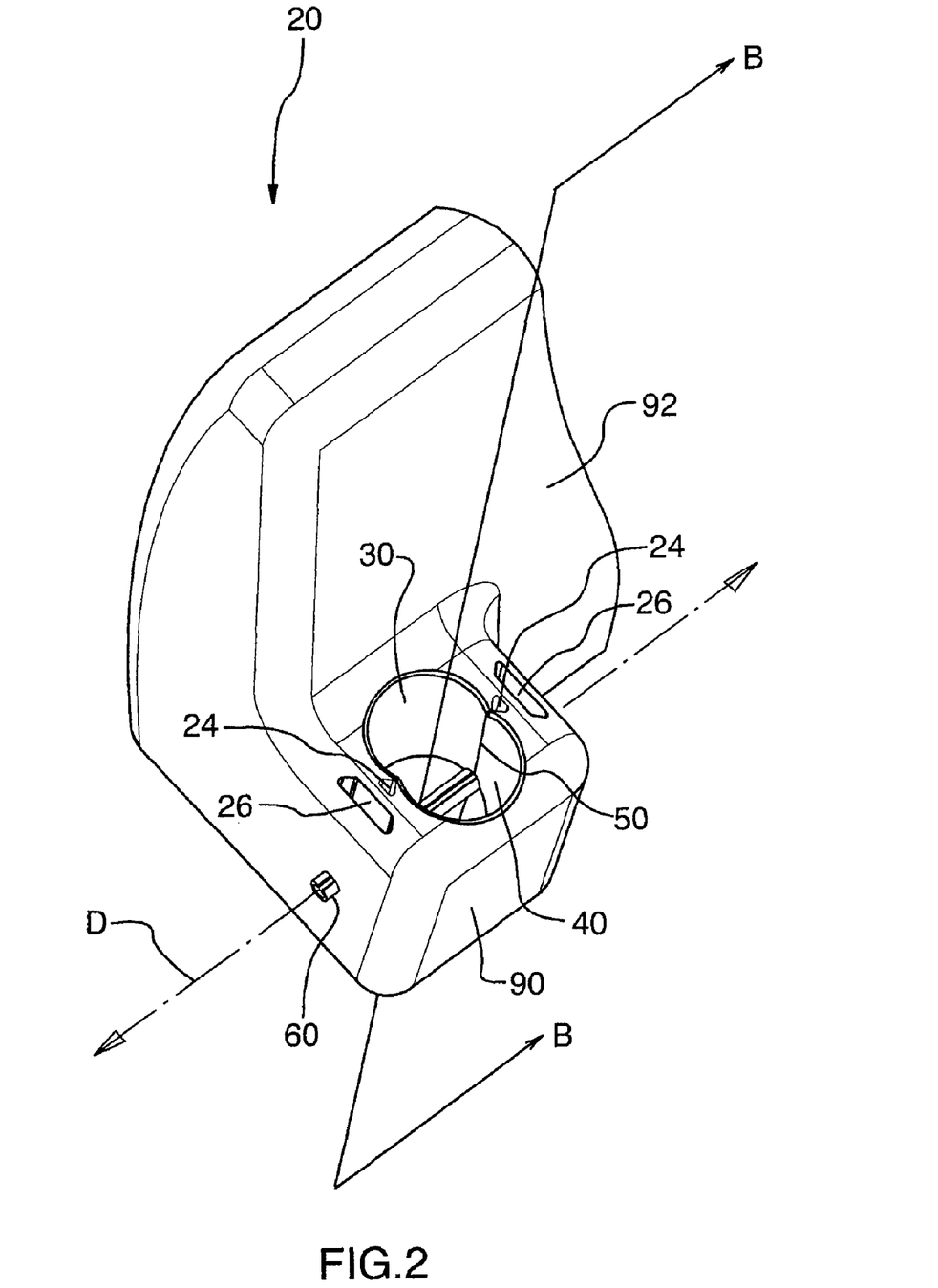
FIG. 2 is a detailed perspective view of a portion of the headrest of FIGS. 1a-1c shown without a mounting post.
Figure 5A:
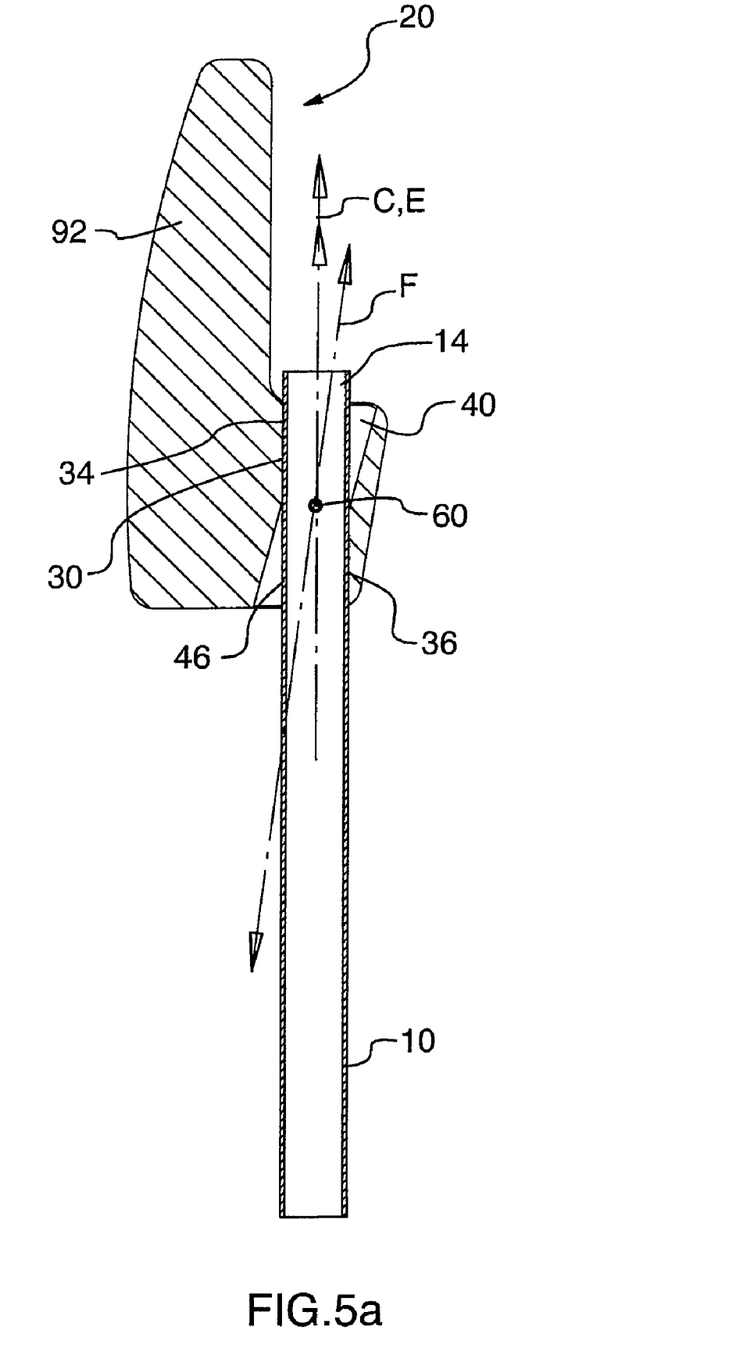
FIGS. 5a to 5c are sectional views taken along sightline A-A of FIGS. 4a to 4c, respectively.
Figure 5B:
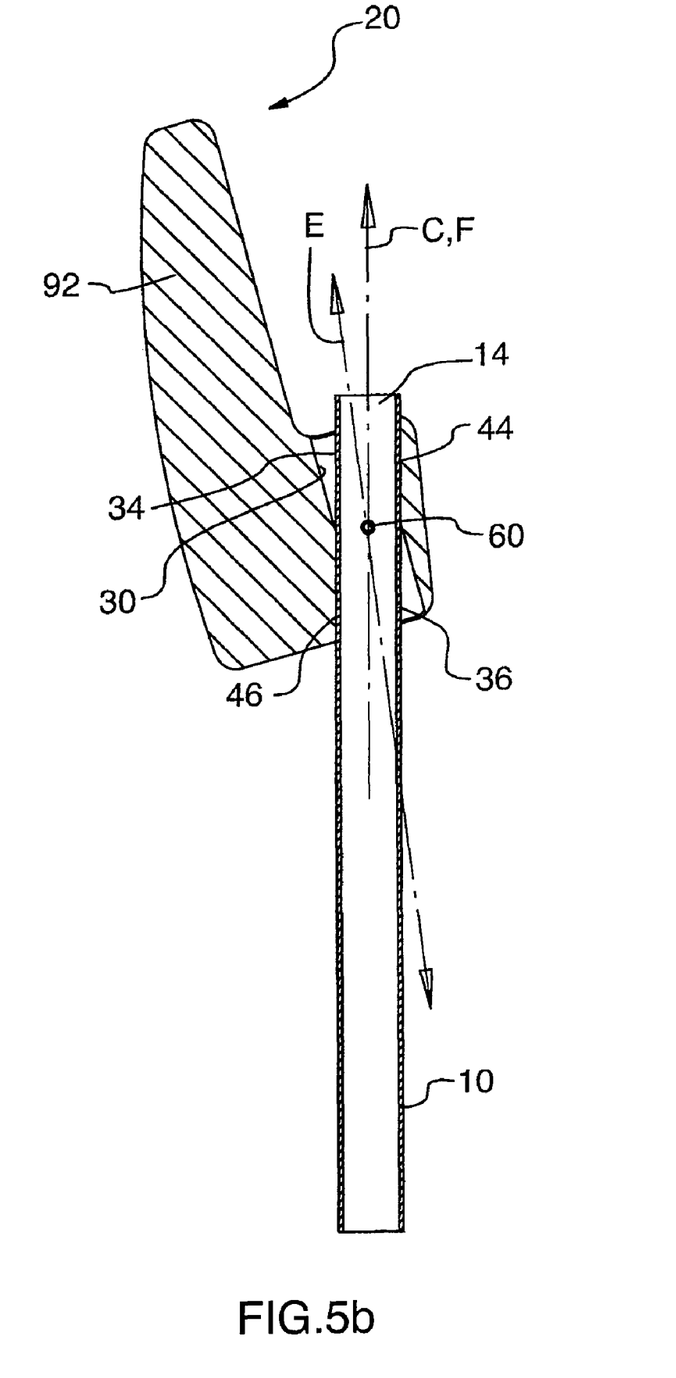
Figure 5C:
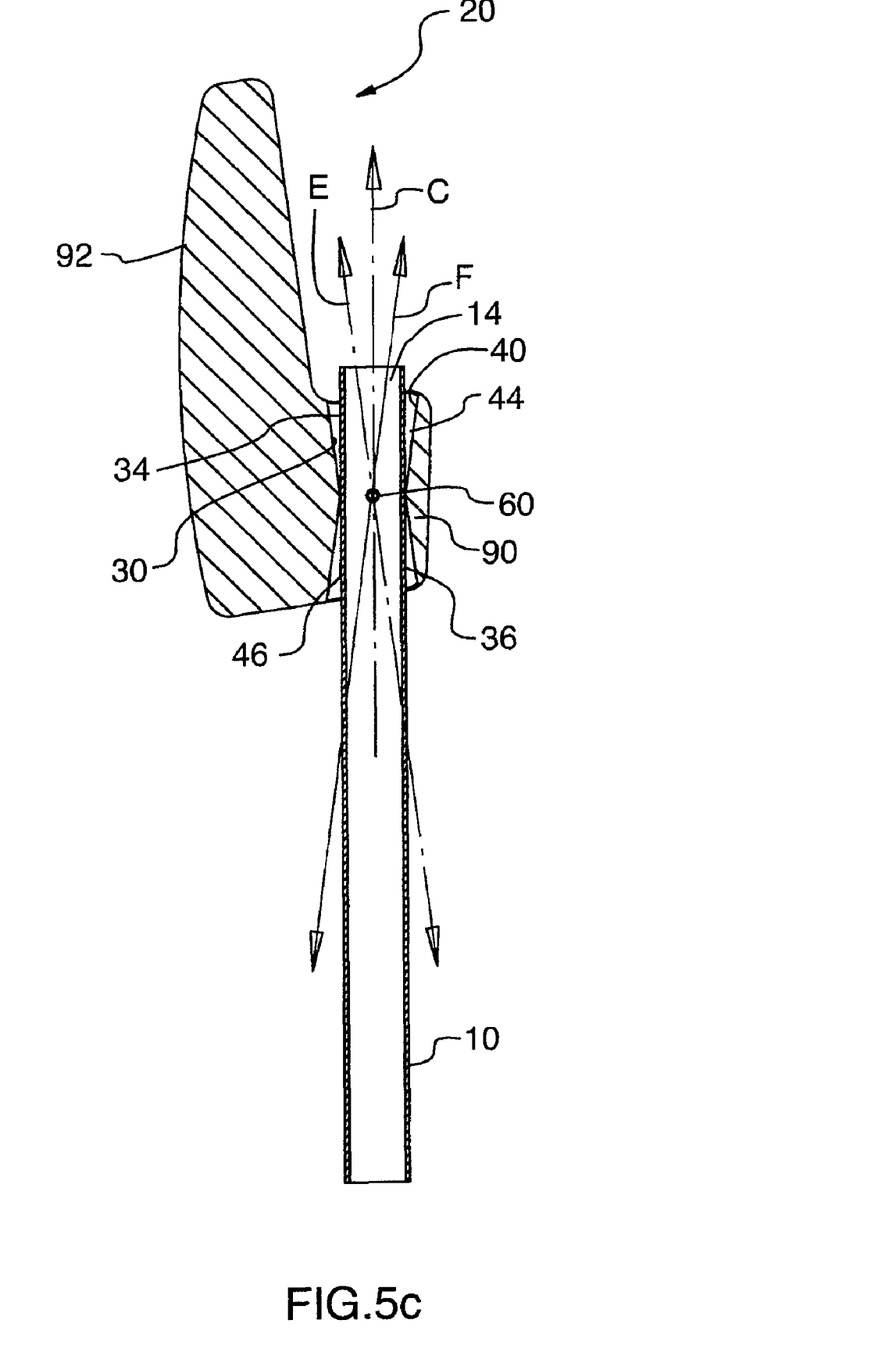
Figure 6:
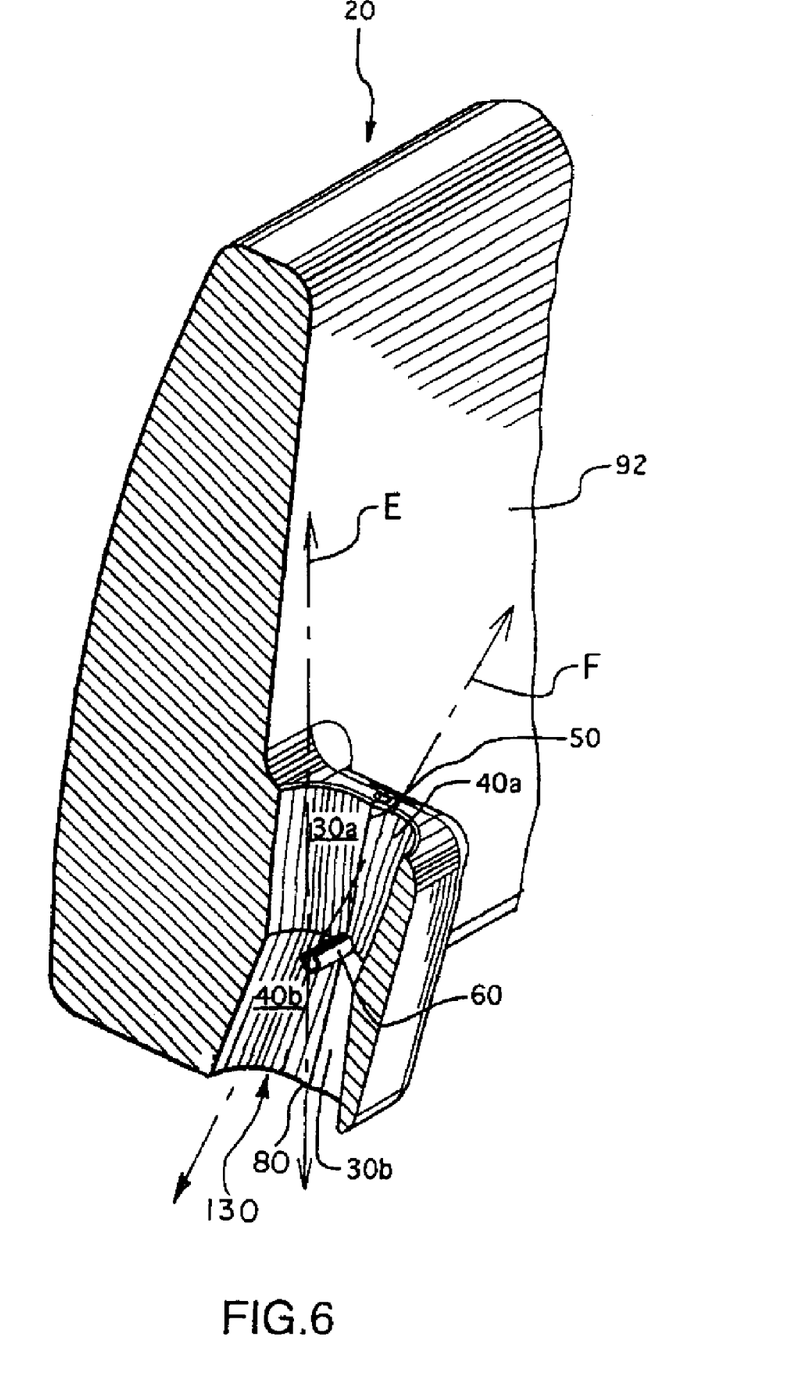
FIG. 6 is a sectional view taken along sightline B-B of FIG. 2.

Referring particularly to FIG. 2, sleeve portions 30 and 40 are shown to have semi-circular cross-sections with a vertically extending waisted portion 50 formed therebetween. Waisted portion 50 that forms a raised internal surface feature at the junction between the first and second sleeve portions 30, 40, which surface feature is shaped and dimensioned to resist pivotal movement of the headrest between the first and second pivot positions below application of a directed threshold force to the headrest 20. Referring to FIGS. 5a to 5c, the semi-circular cross-section of the first sleeve portion 30 defines a first sleeve axis E and the semi-circular cross-section of the second sleeve portion 40 defines a second sleeve axis F. First sleeve axis E is aligned with a longitudinal axis C of the post when the headrest is in the first pivot position. Second sleeve axis F is aligned with the longitudinal axis C of the post when the headrest is in the second pivot position. FIG. 6 shows the internal surface of the sleeve formed by the semi-circular cross-sections with pivotally offset axes E and F. The first 30 and second 40 sleeve portions are contiguous with one another, meet at the waisted portion 50, and form a space defining the degree of pivoting that the headrest 20 is permitted to undergo. This degree of pivoting can also be defined by the difference in angle between the longitudinal axes E and F.

In the preferred embodiment illustrated, and with particular reference to FIGS. 5a, 5b, 5c and 6, the first sleeve portion 30 includes the surface 30a of the sleeve 30 which provides a retention surface which contacts approximately one half of the cross-sectional region 34 of post 10 above pin 60, as shown in FIG. 5a, and the surface 30b of the sleeve 30 which provides a retention surface which contacts an opposite approximately one half of the cross-sectional region 36 of post 10 below pin 60 when the headrest 20 is in the first pivot position. Similarly, second sleeve portion 40 includes the surface 40a of the sleeve 40 which provides a retention surface which contacts approximately one half of the cross-sectional region 44 of post 10 above pin 60, as shown in FIG. 5b, and the surface 40b of the sleeve 40 which provides a retention surface which contacts the opposite approximately one half of the cross-sectional region 46 of post 10 below pin 60, when the headrest 20 is in the second pivot position. The retention surfaces 30a, 30b, 40a, and 40b are sized and shaped to retain, in contacting relation, respective regions 34, 36, 44 and 46 of the post 10 as described above. Such surface contact allows the respective portions of post 10 to be fully retained against further rotational movement at the aforementioned limit positions, as shown in FIGS. 5a and 5b.

Figure 3:
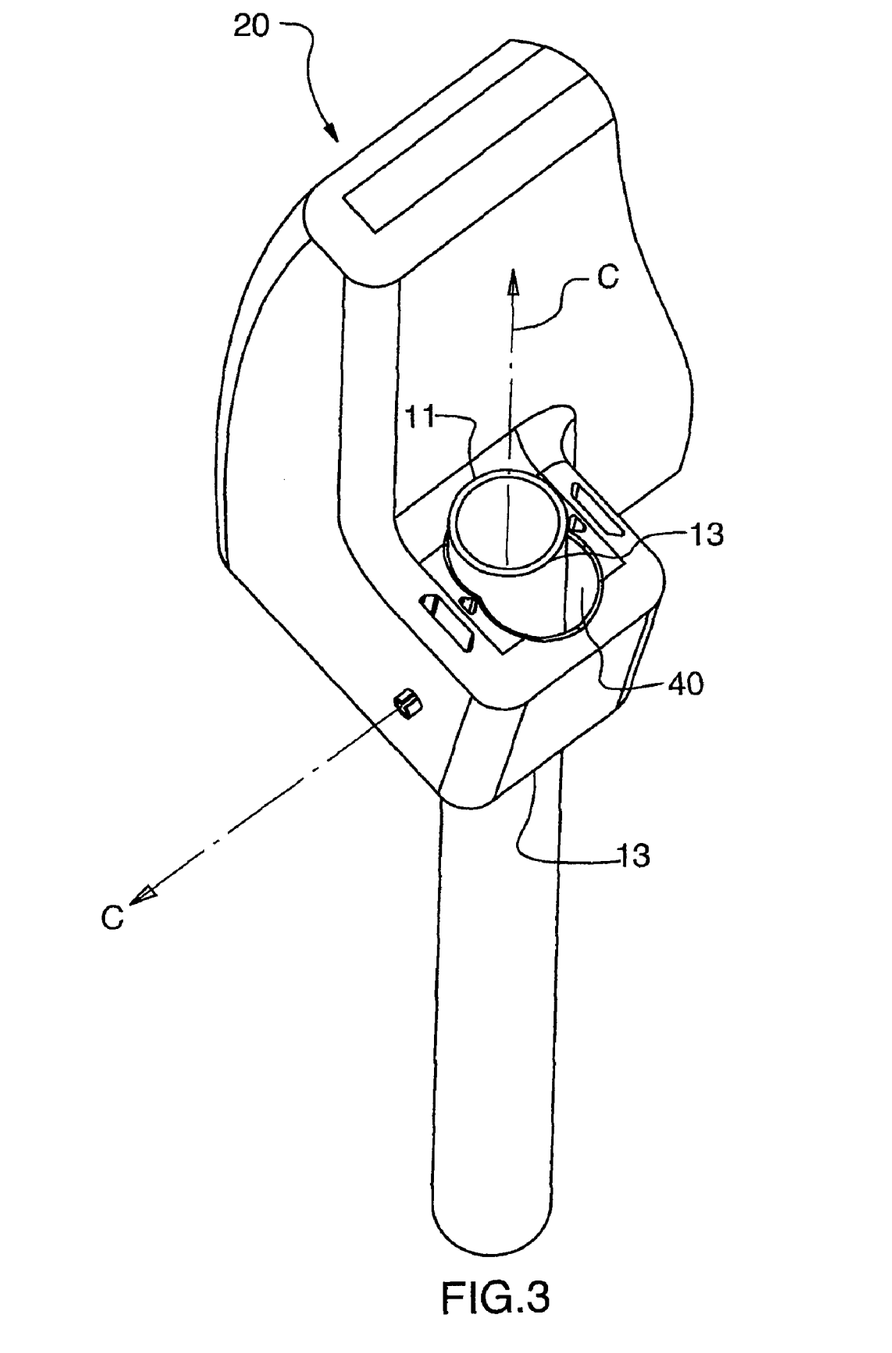
FIG. 3 is a view similar to FIG. 2 shown with the mounting post.

As seen in FIG. 2, the vertically extending waisted portion or ridge 50 provides an internal surface features between the first sleeve portion 30 and the second sleeve portion 40 which has the effect of resisting pivotal movement of the headrest 20 from the first pivot position to the second pivot position. More particularly, the waisted portion 50 frictionally engages the exterior surface of the post 10 to resist pivotal movement of the headrest 20 in a region adjacent to the pin 60. In the embodiment illustrated, the waisted portion 50 is formed by a protuberance of the semi-circular portion around a midpoint of the post 10, as seen in FIG. 3, threat providing a narrowing in the cross-sectional area between the first sleeve portion 30 and the second sleeve portion 40, such that the respective sleeve portion 30 or 40 partially encapsulates post 10. In this manner, post 10 cannot be moved out of contact with the first sleeve portion 30 without first being contacted from the rear by a force great enough to overcome the frictional engagement of the post 10 by the waisted portion 50.

As the cross-sections of the first sleeve portion 30 and the second sleeve portion 40 are angularly offset from one another, a region of intersection exists between the first sleeve portion 30 and the second sleeve portion 40. This region of intersection forms a pair of energy absorption cones, or ridges 80, which allow for further energy absorption above the resistance due to the waisted portion 50. The energy absorption cones 80 (see FIG. 6) provide a region of resistance to pivoting along the entire length of the surface of contact between the post 10 and the first sleeve portion 30.

Figure 4A:
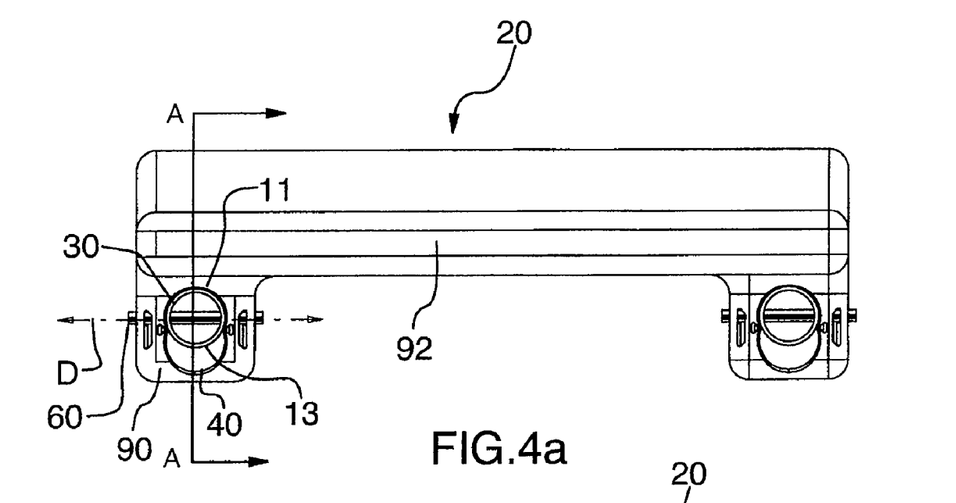
FIGS. 4a to 4c are top plan views of the headrest of FIGS. 1a to 1c shown in the first, second and intermediate positions, respectively.
Figure 4B:
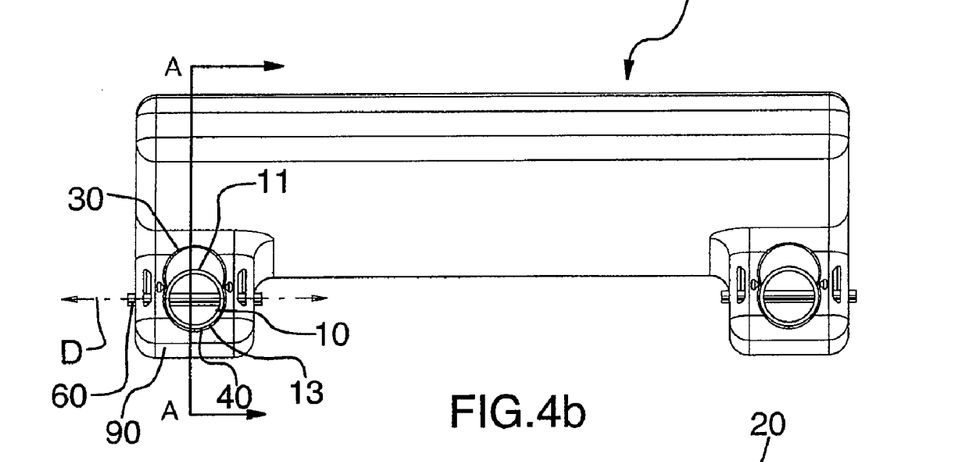

By way of non-limiting example only, and to better describe the invention, the first 30 and second 40 sleeve portions can be formed by removing material from the headrest corresponding to the post 10 when the headrest is in the first pivot position, and subsequently removing material from the headrest 20 corresponding to the post 10 when the headrest 20 is in the second pivot position. As shown in FIGS. 4a and 4b, the degree of pivoting of the headrest 20 is such that there is significant overlap in the space occupied by the post 10 in the first and second pivot positions.

Preferably, but optionally, adjacent to the waisted portion 50 of the sleeve portions 30 and 40, there are provided one or more energy absorbing recesses 24, 26. Shown in FIG. 2 are two recesses 24 and 26 on either side of the sleeve portions 30 and 40. These recesses 24, 26 allow for controlled flexion of the material of the headrest 20 adjacent the waisted portion 50 during pivotal movement of the headrest 20 as aforesaid.

Referring now to FIGS. 5a and 5b, the post 10 is shown to have a free end portion 14. In the region of free end portion 14, post 10 contacts an inner portion of the first sleeve portion 30 when the headrest 20 is in the first position 20a as specifically shown in FIG. 5a. In the region of free end portion 14, post 10 contacts an inner portion of the second sleeve portion 40 when the headrest 20 is in the second position 20b as specifically shown in FIG. 5b. In this manner, pivoting of the headrest from the first pivot position to the second pivot position is restricted within the limits of contact of the free end portion 14. FIG. 5c shows the free end portion 14 in transition between said first 30 and second 40 sleeve portions.

According to a second aspect of the present invention, a method for dissipating impact energy on a headrest includes mounting the headrest 20, as hereinbefore described and illustrated, on one or more, and preferably two vertically extending posts 10 extending from a backrest of a vehicle seat. Headrest 20 includes one or more, and typically two sleeve portions 30 and 40 shaped and otherwise dimensioned to surround a portion of a respective post 10. The sleeve portions are provided with an internal surface shaped and otherwise dimensioned to frictionally interact with the post 10 to resist pivotal movement of the headrest 20 between first and second pivot positions below application of a directed threshold force. The headrest 20 is mounted by providing a pivot means about pivot axis D. According to this aspect of the invention, the pivot means comprises pin 60 which extends between sleeve portions 30 and 40 and the respective post 10 and allows for a pivotal relationship between the headrest 20 and post 10 such that headrest 20 can pivot from a first pivot position, shown in FIG. 1a to a second pivot position, shown in FIG. 1b. According to this method, the headrest 20 may include all structural features and internal geometry as hereinbefore described and includes all functions as described below.

In normal operation, headrest 20 is generally in the first pivot position as shown in FIG. 1a. The waisted portion 50 and cones 80 surround or otherwise engage a portion of post 10 to frictionally resist pivoting movement of the headrest 20 below application of a directed threshold force. The threshold force is a pre-determined force which, when applied to the back of the main body portion 92 of the headrest 20, is large enough to overcome the frictional resistance resulting from the waisted portion 50 on post 10, such that the headrest 20 pivots from the first pivot position to the second pivot position. For example, if a passenger in the back seat pushes at the headrest 20 with an arm, or otherwise positions the arm on the headrest 20 for support, the resulting force is below the threshold force, and thus the headrest 20 supports the arm and does not pivot. However, upon deceleration following a crash, or other impact, the body of a rear seat passenger may be carried into collision with the back of the headrest 20. If the resultant force on the headrest 20 is above the threshold value, the frictional resistance is overcome and the headrest 20 pivots while dissipating a portion of the impact energy of the collision.

FIG. 1c shows headrest 20 in a transitional position between the first and second pivot positions. Above application of the threshold force, the resistance provided by the waisted portion 50 and flexion of the material adjacent the waisted portion 50 into the energy absorption recesses 24, 26, as the headrest 20 pivots from the first position (FIG. 1a) through the transitional position (FIG. 1c), and on to the second position (FIG. 1b) is overcome. The waisted portion 50 and energy absorption recesses 24, 26 are designed to provide the requisite degree of energy dissipation to the passenger's head impacting the headrest 20 to be in conformance with, for example, the aforementioned UN-ECE Regulation 17.

The design parameters of the headrest 20 are therefore determined as a function of the relational resistance against the post 10 caused by waisted portion 50, cones 80 and the flexion properties of the material used to construct the lug portions 90 and mounting sleeves 74, in conjunction with the energy absorption recesses 24, 26. These properties may be readily determined using available design techniques.

When the front seat (not shown) is occupied, and the passenger therein seated is subjected to a whiplash effect or otherwise subjects the headrest 20 to a force from the front of the car, the headrest 20 of the present invention cannot pivot rearwardly from the first position as shown in FIG. 1a. Shown in FIG. 5a, the post 10 is retained against such rearward pivoting by contact of the first sleeve portion 30 with the cross-sectional regions 34 and 36 of the post 10, when in the design position, ie. the first position shown in FIG. 1a.

The headrest 20 can be manufactured from any material capable of undergoing the flexion required to overcome the frictional resistance in pivoting from the first position to the second position. According to the preferred embodiment, the headrest 20 is manufactured from a plastics material, such as polypropylene, ABS or nylon. The plastics material can further contain additives to optimize the required flexion, frictional or other material properties as required. The plastics material is preferably a thermoplastics material.

The headrest 20 can be produced, for example by known molding procedures, such as injection molding, so as to have integrated therein all of the features described above. Alternatively, the headrest 20 could be produced to be generally hollow (not shown), produced, for example, by blow molding polyethylene plastics material with either integral mounting sleeves 74, or separate mounting sleeves 74. Alternatively, the mounting sleeves 74 may be inserted during the assembly process into the lug portions 90 of the headrest 20, and may be formed of a different plastics material, and/or a different molding process than is used for the main body portion 92, for example, by injection molding of a harder plastics material.

The present invention eliminates the need for, but does not exclude the use of, a foam core in construction of the main body portion 92 of the headrest 20, and soft material covering thereafter. Accordingly, it is contemplated that headrests formed at least partially with foam cores and/or a soft material covering may also advantageously incorporate the energy dissipating features of the present invention.

Other modifications and alterations may be used in the design and manufacture of other embodiments according to the present invention without departing from the spirit and scope of the invention, which is limited only by the accompanying claims. For example, pivot means other than a pin extending through the headrest and the post may be used, such as, for example, studs, or a pair of pins extending from each side of the headrest into the post. Moreover, other internal surface features which act to resist pivoting of the headrest about the post, apart from those illustrated and described herein, are all within the scope of the present invention; for example dimples extending from an internal surface of a mounting sleeve between the first sleeve portion and the second sleeve portion. Other features or elements which provide pivotal resistance to the headrest are also contemplated and are within the scope of the present invention.

It is further contemplated that the vertically extending posts on which the headrest is mounted may have non-circular cross-sections, such as ovular or elliptical cross-sections. In this case, the sleeve portions will be shaped appropriately to have generally ovular or elliptical cross-sections to correspond with the post. It is further contemplated that the sleeve portion may surround and engage the post in a region above the pivot axis and only provide a clearance space for pivoting below the pivot axis. Similarly, the sleeve portion may surround and engage the post in a region below the pivot axis and provide a clearance space for pivoting above the pivot axis. Furthermore, other shapes and configurations for the sleeve portions which retain the headrest in the first position, the second position, and include a frictional resistance means to provide energy dissipation when pivoting between these two positions are also within the scope of the invention.

Headrest 20 for a front seat (not shown) of a vehicle (not shown) illustratively includes mounting post 10, main body portion 92, and mounting sleeve 74 as shown in FIGS. 1-7. Mounting post 10 is adapted for coupling to a backrest (not shown) of a front seat of a vehicle. Mounting post 10 is arranged to extend in an upward direction along longitudinal axis C. Main body portion 92 includes a front surface and a rear surface as shown in FIGS. 1a-1c. The front surface is arranged to face in a forward direction toward a head of a passenger sitting in the front seat of the vehicle. The rear surface is arranged to face in a rearward direction opposite the forward direction.

Figure 4C:
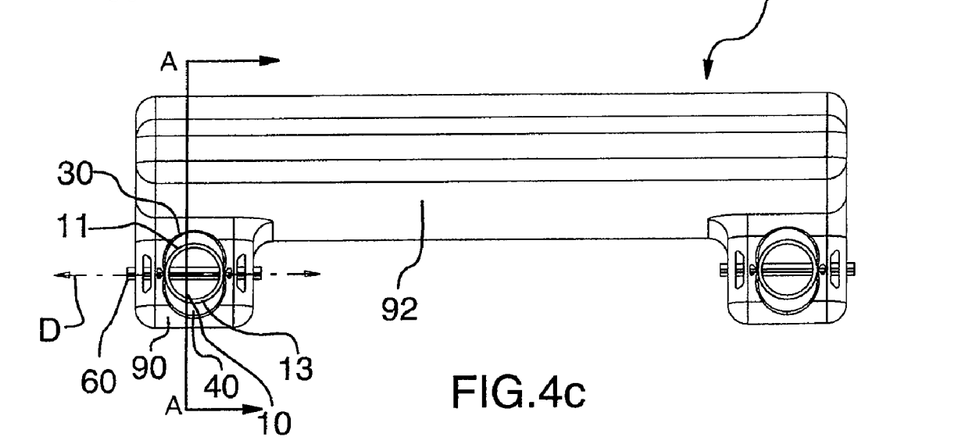

Mounting sleeve 74 is coupled to the rear surface of main body portion 92 to move therewith about pivot axis D arranged to lie in perpendicular relation to longitudinal axis C in the forward direction relative to mounting post 10 from an initial position to a final position as suggested in FIGS. 4a-4c. Mounting sleeve 74 includes first sleeve portion 30 and second sleeve portion 40 as shown in FIG. 6. First sleeve portion 30 includes first surface 30a and second surface 30b that defines a first post-receiving passageway as shown in FIG. 2. Mounting post 10 is arranged to extend through the first post-receiving passageway when main body portion 92 is in the initial position as shown in FIG. 5a. Second sleeve portion 40 includes first surface 40a and second surface 40b that cooperate to define a second post-receiving passageway as shown in FIG. 2. Mounting post 10 is arranged to extend the second post-receiving passageway when the main body portion is in the final position as shown in FIG. 5b.

First surface 30a of first sleeve portion 30 is positioned to lie in opposing confronting relation with first surface 40a of second sleeve portion 40 to form first ridge 50 as shown in FIG. 6. First ridge 50 is arranged to extend into a cavity 130 bounded by first and second sleeve portions 30, 40 as shown in FIG. 6. First ridge 50 resists pivotal movement of main body portion 92 when main body portion is in one of the initial position and the final position as suggested in FIGS. 4a-4c. First ridge 50 deforms and moves away from cavity 130 during movement of main body portion 92 from the initial position to the final position as suggested in FIG. 4c.

Second surface 30b of first sleeve portion 30 and second surface 40b of second sleeve portion 40 form second ridge 80 arranged to extend into cavity 130 to resist pivotal movement of main body portion 92 when main body portion 92 is in one of the initial position and the final position as shown in FIG. 6. Second ridge 80 deforms and moves away from cavity 130 during movement of main body portion 92 from the initial position to the final position as suggested in FIG. 4c. Second ridge 80 is positioned to lie in spaced-apart relation to first ridge 50 to cause pivot axis D to lie therebetween as shown in FIG. 6.

Figure 7:
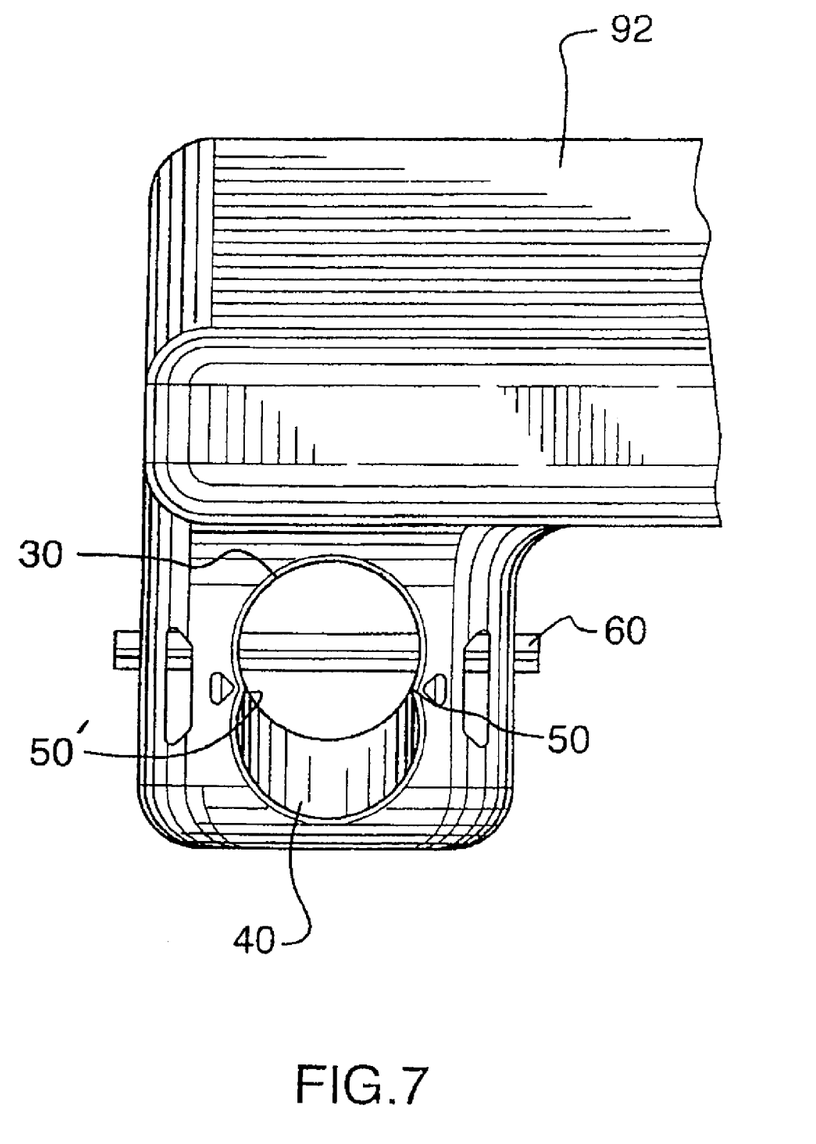
FIG. 7 is a top plan view of the portion of the headrest shown in FIG. 2.

Second surface 30b of first sleeve portion 30 is positioned to lie in opposing confronting relation with second surface 40b of second sleeve portion 40 to form third ridge 50' arranged to extend into cavity 130 to resist pivotal movement of main body portion 92 when the main body portion is in one of the initial position and the final position as suggested in FIG. 6 and shown in FIG. 7. Third ridge 50' deforms and moves away from cavity 130 during movement of main body portion 92 from the initial position to the final position as suggested in FIG. 4c. Third ridge 50' is positioned to lie in spaced-apart relation to first ridge 50 to locate mounting post 10 therebetween as shown in FIGS. 4a-4c. First bridge 50, second bridge 80, and pivot axis D are aligned in collinear relation to one another as shown in FIG. 6.

Mounting sleeve 74 is formed to include an energy absorbing recess 24 as shown in FIG. 2. Energy absorption recess 24 is positioned to lie in spaced-apart relation to mounting post 10 to locate first ridge 50 therebetween to allow flexion of first ridge 50 away from mounting post 10 and into the energy absorption recess 24 during movement of main body portion 92 from the initial position to the final position as suggested FIG. 4c.

As shown in FIG. 6, first surface 30a of first sleeve portion 30 has a concave surface arranged to face toward mounting post 10. First surface 40a of second sleeve portion 40 has a concave surface arranged to face toward mounting post 10 and first surface 30a of first sleeve portion 30 as shown in FIG. 7.

We claim:

1. A headrest for mounting on one or more vertically extending posts positioned on the backrest of a front seat of a vehicle, the headrest comprising:
   a) one or more mounting sleeves positioned on the headrest and adapted to surround a portion of a respective one of said posts;
   b) a pivot means extending between each mounting sleeve and the respective post to mount said mounting sleeve on the respective post in pivotal relation thereto about a pivot axis substantially transverse to the longitudinal axis of the post;
   c) each said mounting sleeve being shaped and otherwise dimensioned on an internal surface to interact with said respective post to resist pivotal movement of the headrest between first and second pivot positions below application of a directed threshold force to the headrest by a rear passenger onto a rear surface of the headrest,
   wherein each of said mounting sleeves frictionally interact with the respective post in a region adjacent to the pivot means so as to resist said pivotal movement,
   wherein said one or more mounting sleeves each comprise at least a first sleeve portion contiguous with a second sleeve portion with said first sleeve portion shaped and otherwise dimensioned to surround and retain an initial portion of the post in contacting relation when the headrest is in said first pivot position, and with said second sleeve portion shaped and otherwise dimensioned to surround and retain a final portion of the post in contacting relation when said headrest is in said second pivot position,
   wherein the post is cylindrical, said first and second sleeve portions have substantially semi-circular cross-sections defining a first sleeve axis and a second sleeve axis respectively, wherein said first sleeve axis is aligned with the longitudinal axis of the post when the headrest is in said first pivot position, and wherein said second sleeve axis is aligned with the longitudinal axis of the post when the headrest is in said second pivot position, wherein said one or more mounting sleeves are shaped and otherwise dimensioned to resist said pivotal movement by means of a waisted portion formed at a junction of said first sleeve portion and said second sleeve portion, and further comprising one or more energy absorption recesses positioned in adjacent relation to said waisted portion to allow flexion of said waisted portion upon said interaction with the respective post.

2. A headrest according to claim 1, wherein the post comprises a free end portion and, in said first pivot position, said free end portion contacts an interior surface of said first sleeve portion, and, in said second position, said free end portion contacts an interior surface of said second sleeve portion thereby limiting said pivotal movement of the headrest in an opposed pivotal direction.

3. A headrest according to claim 2, wherein said pivot means comprises a pin extending transversely through the post.

4. A headrest according to claim 3, wherein at least part of said headrest is constructed from a plastics material.

5. A headrest according to claim 4, wherein said plastics material is selected from the group consisting of polypropylene, ABS, nylon, and other thermoplastics materials.

6. A headrest according to claim 2, further comprising one or more lug portions extending rearwardly from a main body portion of the headrest to house said one or more mounting sleeves.

7. A method for dissipating impact energy on a headrest comprising:
   a. mounting a headrest on one or more vertically extending posts positioned on the backrest of a front seat of a vehicle, the headrest comprising one or more mounting sleeves adapted to surround a portion of a respective one of said posts,
   b. providing a pivot means extending between each mounting sleeve and the respective post to mount said mounting sleeve on the respective post in pivotal relation thereto about a pivot axis substantially transverse to the longitudinal axis of the post;
   c. providing an internal surface on each said mounting sleeve shaped and otherwise dimensioned to frictionally interact with the respective post to resist pivotal movement of the headrest between first and second pivot positions below application of a directed threshold force to the headrest by a rear passenger onto a rear surface of the headrest, wherein said one or more mounting sleeves each comprise at least a first sleeve portion contiguous with a second sleeve portion, with said first sleeve portion shaped and otherwise dimensioned to surround and retain an initial portion of the post in contacting relation when the headrest is in said first pivot position and with said second sleeve portion shaped and otherwise dimensioned to surround and retain a final portion of the post in contacting relation when said headrest is in said second pivot position, wherein the post is cylindrical, said first and second sleeve portions have semi-circular cross-sections defining a first sleeve axis and a second sleeve axis respectively, wherein said first sleeve axis is aligned with the longitudinal axis of the post when the headrest is in said first pivot position, and, wherein said second sleeve axis is aligned with the longitudinal axis of the post when the headrest is in said second pivot position, wherein said internal surface is shaped and otherwise dimensioned as a waisted portion between said first sleeve portion and said second sleeve portion to resist movement of the headrest between the first and the second pivot positions below application of said directed threshold force to the headrest, and further comprising the step of providing one or more energy absorption recesses positioned within said headrest in adjacent relation to said waisted portion to allow flexion of said waisted portion upon said interaction with the respective post.

8. A method according to claim 7, wherein the post comprises a free end and, in said first pivot position, said free end contacts an interior surface of said first sleeve portion, and, in said second position, said free end contacts an interior surface of said second sleeve portion thereby limiting said pivotal movement of the headrest in an opposed pivotal direction.

9. A method according to claim 8, wherein said pivot means comprises a pin extending transversely through the post.

10. A headrest for mounting on one or more vertically extending posts positioned on the backrest of a vehicle seat, the headrest comprising:
   a) one or more mounting sleeves positioned on the headrest and adapted to surround a portion of a respective one of said posts;
   b) a pivot means extending between each mounting sleeve and the respective post to mount said mounting sleeve on the respective post in pivotal relation thereto about a pivot axis substantially transverse to the longitudinal axis of the post;
   c) each said mounting sleeve being shaped and otherwise dimensioned on an internal surface to interact with said respective post to resist pivotal movement of the headrest between first and second pivot positions below application of a directed threshold force to the headrest by a rear passenger onto a rear surface of the headrest, wherein each of said mounting sleeves frictionally interact with the respective post in a region adjacent to the pivot means so as to resist said pivotal movement, wherein said one or more mounting sleeves each comprise at least a first sleeve portion contiguous with a second sleeve portion, with said first sleeve portion shaped and otherwise dimensioned to surround and retain an initial portion of the cost in contacting relation when the headrest is in said first pivot position, and with said second sleeve portion shaped and otherwise dimensioned to surround and retain a final portion of the post in contacting relation when said headrest is in said second pivot position, wherein the post is cylindrical, said first and second sleeve portions have substantially semi-circular cross-sections defining a first sleeve axis and a second sleeve axis respectively, wherein said first sleeve axis is aligned with the longitudinal axis of the post when the headrest is in said first pivot position, and wherein said second sleeve axis is aligned with the longitudinal axis of the post when the headrest is in said second pivot position, wherein said one or more mounting sleeves are shaped and otherwise dimensioned to resist said pivotal movement by means of a waisted portion formed at a junction of said first sleeve portion and said second sleeve portion, and further comprising one or more energy absorption recesses positioned in adjacent relation to said waisted portion to allow flexion of said waisted portion upon said interaction with the respective post.

11. A headrest for a front seat of a vehicle, the headrest comprising
a mounting post adapted for coupling to a backrest of a front seat of a vehicle, the mounting post being arranged to extend in an upward direction along a longitudinal axis,
a main body portion including a front surface arranged to face in a forward direction and an opposite rear surface arranged to face in a rearward direction opposite the forward direction, and
a mounting sleeve coupled to the rear surface of the main body portion to move therewith about a pivot axis arranged to lie in perpendicular relation to the longitudinal axis in the forward direction relative to the mounting post from an initial position to a final position, the mounting sleeve includes a first sleeve portion and a second sleeve portion, the first sleeve portion includes a first surface and a second surface that cooperate to define a first post-receiving passageway through which the mounting post is arranged to extend through when the main body portion is in the initial position, the second sleeve portion includes a first surface and a second surface that cooperate to define a second post-receiving passageway through which the mounting post is arranged to extend through when the main body portion is in the final position,
wherein the first surface of the first sleeve portion is positioned to lie in opposing confronting relation with the first surface of the second sleeve portion to form a first ridge arranged to extend into a cavity bounded by the first and the second sleeve portions to resist pivotal movement of the main body portion when the main body portion is in one of the initial position and the final position and the first ridge deforms and moves away from the cavity during movement of the main body portion from the initial position to the final position.

12. The headrest of claim 11, wherein the second surface of the first sleeve portion and the second surface of the second sleeve portion cooperate to form a second ridge arranged to extend into the cavity to resist pivotal movement of the main body portion when the main body portion is in one of the initial position and the final position and the second ridge deforms and moves away from the cavity during movement of the main body portion from the initial position to the final position.

13. The headrest of claim 12, wherein the first ridge, the second ridge, and the pivot axis lie in collinear relation to one another.

14. The headrest of claim 12, wherein the first surface of the first sleeve portion and the first surface of the second sleeve portion cooperate to form a third ridge arranged to extend into the cavity to resist pivotal movement of the main body portion when the main body portion is in one of the initial position and the final position and the third ridge deforms and moves away from the cavity during movement of the main body portion from the initial position to the final position.

15. The headrest of claim 14, wherein the third ridge is positioned to lie in spaced-apart relation to the first ridge to cause the mounting post to lie therebetween.

16. The headrest of claim 15, wherein the mounting sleeve is formed to include an energy absorption recess positioned to lie in spaced-apart relation to the mounting post to locate the first ridge therebetween to allow flexion of the first ridge away from the mounting post and into the energy absorption recess during movement of the main body portion from the initial position to the final position.

17. The headrest of claim 11, wherein the first surface of the first sleeve portion has a concave surface arranged to face toward the mounting post.

18. The headrest of claim 17, wherein the first surface of the second sleeve portion has a concave surface arranged to face toward the mounting post and the first surface of the first sleeve portion.

19. The headrest of claim 11, wherein the mounting sleeve is formed to include an energy absorption recess positioned to lie in spaced-apart relation to the mounting post to locate the first ridge therebetween to allow flexion of the first ridge away from the mounting post and into the energy absorption recess during movement of the main body portion from the initial position to the final position.

* * * * *